United States Patent Office 2,714,762
Patented Aug. 9, 1955

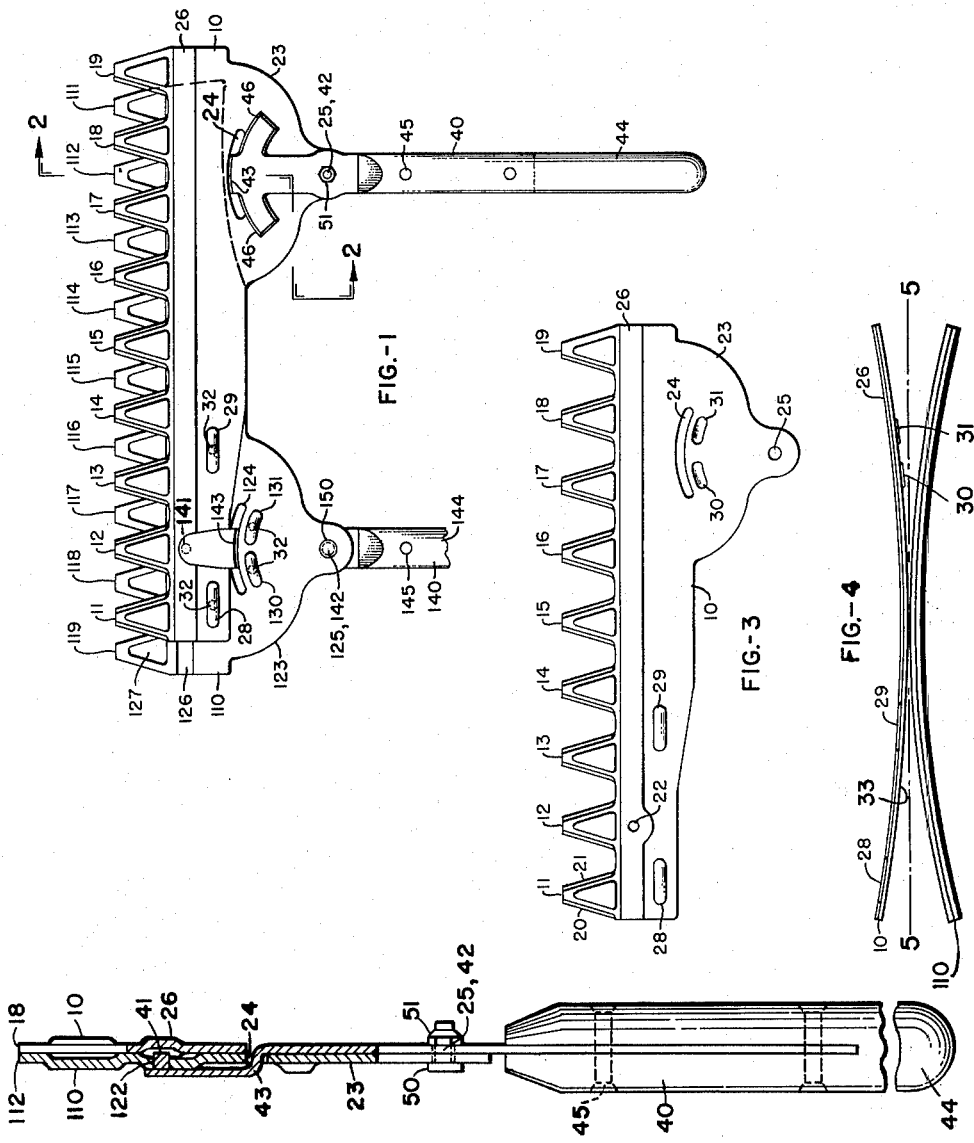

2,714,762

MULTI-BLADE HEDGE TRIMMER

Wyman R. Green, Madison, N. J.

Application October 1, 1952, Serial No. 312,615

4 Claims. (Cl. 30—211)

This invention relates to hedge trimmers of the multi-blade type as more fully set forth hereinafter and as claimed.

One of the objects of my invention is to provide a hedge trimmer that is light in weight, simple in construction, effective in operation, and that can be produced inexpensively;

Another object is to provide a hedge trimmer which employs two cutter bars of like shape;

A further object is to provide a hedge trimmer in which the manual force applied in its operation is multiplied by simple leverage, and which has a center of gravity close to the line connecting the points at which the manual force is applied so as to reduce the operator's effort to a minimum;

Another object is to provide a hedge trimmer with cutter bars which, although made of relatively thin metal, are stiff and in firm contact with each other along their entire length;

A further object is to provide a hedge trimmer in which friction is reduced to a minimum;

Still another object of my invention is to provide a multi-blade hedge trimmer that in its simplest form consists of a minimum number of parts; two similar cutter bars, two similar operating levers, and a number of minor small parts.

The manner in which these and other objects are achieved is described in the following specification and illustrated in the accompanying drawings in which:

Fig. 1 is a view of a hedge trimmer according to my invention;

Fig. 2 is a view partly in section along line 2—2 of Fig. 1;

Fig. 3 is a view of the cutter bar 10 of Fig. 1; and

Fig. 4 is an end view of the cutter bars 10 and 110 shown in Fig. 3.

Like numerals refer to like parts throughout the several views.

Referring now to Fig. 1, my hedge trimmer comprises two cutter bars 10 and 110 which are of like shape, and one of which is shown more clearly in Figs. 3 and 4. Each of the cutter bars 10 and 110 has on one side thereof a plurality of knives 11 to 19 and 111 to 119, respectively. The knives are advantageously formed integral with the cutter bars and each has two cutting edges as shown at 20 and 21 on the knife 11 of Fig. 3. Each cutter bar is provided with a fulcrum hole 22 and 122 respectively and with a projection 23 and 123 respectively on which is located a second fulcrum hole 25 and 125 respectively. Near the base of the projections 23 and 123 are arcuate openings 24 and 124 respectively. Each cutter bar has a longitudinal offset bend 26 and 126 respectively, serving to reduce the surface contact and to make the cutter bars more rigid. Each knife is advantageously provided with a relief cavity as shown at 127 on knife 119, Fig. 1. The cutter bars 10 and 110 are furthermore provided with cavities 28 to 31 and 128 to 131 respectively adapted to receive anti-friction balls 32.

My hedge trimmer has furthermore two operating levers 40 and 140 of similar shape, each provided near one end with a pivot pin 41 and 141, respectively, and with a bearing in fulcrum holes 42 and 142 respectively. Between the aforesaid pivot pin and bearing on each lever is an offset bend 43 and 143 respectively. Each of the operating levers 40 and 140 has wooden hand grips 44 and 144 respectively attached thereto by means of rivets 45 and 145. Each lever is furthermore provided with a pair of wings as shown at 46 on lever 40.

In the assembled hedge trimmer, as illustrated in Figs. 1 and 2, the offset bands 43 and 143 are disposed in the arcuate openings 24 and 124 respectively, the pivot pin 41 being disposed in fulcrum hole 122 of cutter bar 110 and the corresponding pivot pin 141 of lever 140 being disposed in fulcrum hole 22. Shoulder screw 50 passes through bearing hole 42 and fulcrum hole 25, and shoulder screw 150 passes through bearing hole 142 and fulcrum hole 125. Two lock nuts as shown at 51 on screw 50 fitted over the ends of the shoulder screws are all that is required to hold the assembled hedge trimmer together with the shoulder screws 50 and 150 thus serving as pivot means.

Each of the cutter bars 10 and 110 is advantageously curved as shown in Fig. 4 so that it presents a convex face 33 to the other. Such curvature results in a close contact between the two cutter bars over their entire length along line 5—5 when assembled and prevents any possible gap between the centrally located knives.

Fig. 1 shows my hedge trimmer in an intermediate position which it normally would not assume but which has been chosen so as to better illustrate all parts and their relative positions.

In operation, the operator holds the hand grips 44 and 144, moving them alternately towards each other and away from each other, while at the same time advancing along the hedge or other growth that is to be trimmed. On pushing the hand grips 44 and 144 towards each other the cutter bars 10 and 110 slide over each other in frictional contact until knife 11 comes opposite knife 119, knife 12 comes opposite 118 and so forth. On pulling the grips 44 and 144 apart from each other the cutter bars slide until knife 11 comes opposite knife 118, knife 12 opposite knife 117 and so forth. There is thus a shearing action during each stroke and a hedge can be trimmed quickly and effectively by advancing the hedge trimmer along it while at the same time moving the levers to and fro.

To operate effectively the cutter bars 10 and 110 must be in close contact. The shoulder screws 50 and 150 are accordingly made to hold the parts together snugly without at the same time holding them so tightly as to cause excessive friction which would unduly increase the effort required to operate the hedge trimmer. The friction is, of course, reduced by the balls 32, those in cavities 28, 29, 128 and 129 being between the two cutter bars and those in cavities 30, 31, 130 and 131 being between a cutter bar and an operating lever and, more specifically, the wings (such as shown at 46) carried by such operating lever. It is to be noted that the cavities 28, 29, 128 and 129 open into the faces which the cutter bars present to each other (such as face 33 of cutter bar 10, Fig. 4) whereas the cavities 30, 31, 130 and 131 open into the opposite faces of the cutter bars.

The cutter bars and levers of my hedge trimmer can be made from flat sheet stock. This makes for low weight and low manufacturing cost. The cutter bars must, of course, be hardened after manufacture to provide cutting edges (such as 20 and 21) which will remain sharp for a satisfactorily long period of time. If the knives become dull after prolonged use, they can readily be filed to make them sharp again without need for taking the hedge trimmer apart.

While I have shown and described what I consider the preferred embodiment of my invention, modifications may be made without departing from its spirit and reference is therefore made to the appended claims for a definition of the scope of this invention.

What I claim is:

1. A hedge trimmer comprising two similar juxtaposed oblong cutter bars in sliding engagement with each other, each cutter bar being provided with a plurality of cutting knives on one long edge of each cutter bar, a fulcrum near one short edge of each cutter bar, a projection near the other short edge of each cutter bar, an arcuate opening near the base of each of said projections and another fulcrum in each of said projections, and two similar operating levers each having a fulcrum near one end thereof, each of said last named fulcrums being operatively connected with one of said first named fulcrums, another fulcrum on each of said levers, each of said last named fulcrums being operatively connected with the said fulcrum in one of said projections, and an offset bend in each of said levers between said two fulcrums on said levers, each of said offset bends passing through said arcuate opening near the base of said projection to which the said lever is fulcrumed.

2. The combination of claim 1, each of said cutter bars being made with a convex face facing the convex face of the other of said cutter bars, said convex faces being straightened by contact of said cutter bars in the assembled hedge trimmer.

3. In the combination of claim 1, a pair of wings on each of said operating levers, cavities in each of said cutter bars, and balls located in said cavities and retained by said wings.

4. A hedge trimmer comprising two similar juxtaposed oblong cutter bars in sliding engagement with each other, each cutter bar being provided with a plurality of cutting knives on one long edge thereof, a projection on the other long edge thereof located in proximity to one short edge thereof and with an arcuate opening near the base of said projection, and two similar operating levers each having an offset bend passing through one of said arcuate openings, a portion of each of said levers between said offset bend and one end of said lever being located on one side of said juxtaposed cutter bars and pivotally connected to the one of said cutter bars adjacent to said portion, and another portion of each of said levers being located on the other side of said juxtaposed cutter bars and pivotally connected to the said projection on the other of said cutter bars.

References Cited in the file of this patent

UNITED STATES PATENTS

| | | |
|---|---|---|
| 173,564 | Shaw | Feb. 15, 1876 |
| 357,718 | Lee | Feb. 15, 1887 |
| 736,854 | Long | Aug. 18, 1903 |
| 1,494,336 | Bowman | May 20, 1924 |
| 2,486,958 | McQueen | Nov. 1, 1949 |
| 2,566,492 | Howell | Sept. 4, 1951 |